Feb. 10, 1959 D. O. DAVIES 2,872,781
GAS-TURBINE ENGINE REHEAT FUEL SUPPLY SYSTEM
WITH AIR TURBINE DRIVEN FUEL PUMP
Filed April 29, 1954 3 Sheets-Sheet 1

United States Patent Office 2,872,781
Patented Feb. 10, 1959

2,872,781

GAS-TURBINE ENGINE REHEAT FUEL SUPPLY SYSTEM WITH AIR TURBINE DRIVEN FUEL PUMP

David Omri Davies, Kingsway, Derby, England, assignor to Rolls-Royce Limited, Derby, England, a British company Application April 29, 1954, Serial No. 426,320

Claims priority, application Great Britain May 5, 1953

1 Claim. (Cl. 60—35.6)

This invention relates to gas-turbine engine fuel systems. It is concerned particularly with fuel systems for engines of the kind having, in addition to a main combustion stage, one or more additional combustion stages in which gas from the main combustion stage is reheated after passing through a turbine. Such an additional combustion stage is referred to hereafter as a "reheat combustion stage."

In prior U. S. application Serial Number 237,628, now Patent No. 2,814,928, issued Dec. 3, 1957 (D. O. Davies and A. Jubb, assignors to Rolls-Royce Ltd.), there is described and claimed means for controlling the fuel supply to a reheat combustion stage of a gas-turbine engine in a manner to main the ratio of the absolute pressure on the upstream side of the turbine to the absolute pressure on the downstream side of the turbine at a substantially constant preselected value. In accordance with this prior application, in order to achieve the desired result for a gas-turbine engine, which has a compressor, main combustion equipment, a turbine, reheat combustion equipment and a propelling nozzle connected in flow series, there is provided a fuel system comprising a fuel pump arranged to deliver fuel to the reheat combustion equipment, an air turbine connected to drive the fuel pump, a source of compressed air, an air-supply throttle connected to control the supply of compressed air from said source to said air-turbine thereby to control the rotational speed of the turbine, and a pressure-sensitive device connected to be sensitive to a preselected value of the ratio of the pressure at a first point in the engine between the compressor and the turbine (referred to as the "first pressure") to the pressure at a second point between the turbine and the propelling nozzle (referred to as the "second pressure") and connected to said air-supply throttle to operate it, whereby the throttle is adjusted to maintain the preselected value of the pressure ratio. In the particular embodiment of the pressure-sensitive device described in the prior application, there are a pair of spaced flexible diaphragms of different areas and an evacuated capsule connected together to actuate a bleed control valve in a servo system through which the throttle is operated, the larger of the diaphragms being loaded in one sense in accordance with the second pressure and in the opposite sense by the first pressure, and the smaller diaphragm being loaded in said one sense by said first pressure and in the opposite sense by the fluid pressure in the chamber containing the evacuated capsule, which is also subject to the fluid pressure in said one sense, the effective area of the capsule being equal to the effective area of the smaller diaphragm, whereby the loads due to the fluid pressure in the chamber are balanced.

This invention has for an object to provide an improved form of the pressure-sensitive device whereby the need for flexible diaphragms of different effective areas and for a capsule matched to one of the diaphragms is avoided.

According to the present invention, the pressure-sensitive device comprises fluid flow means connected to said first pressure point of the engine to produce therein an auxiliary pressure source such that the raio of the auxiliary pressure to the first pressure is equal to the desired ratio of the second pressure to the first pressure, and a flexible diaphragm connected to be loaded on one side by said auxiliary pressure and on the other side by the second pressure, said flexible diaphragm being connected to control adjustment of the air throttle in a manner to maintain the second pressure equal to the auxiliary pressure.

As in the prior application, the adjustment of the air throttle varies the fuel supply to the reheat combustion stage, and it will be arranged that an unwanted increase in the second pressure will cause a reduction of the fuel supply to the reheat combustion stage to reduce the second pressure until the desired pressure ratio is reached.

As in the prior application, the flexible diaphragm is conveniently arranged to operate a bleed valve in a servo system for actuating the air throttle.

According to a feature of this invention, the means for producing the auxiliary pressure may comprise a conduit connected at one end to the first pressure point and having in it a pair of restrictors in flow series the downstream one of which is choked in operation so that thereby the pressure intermediate the restrictors during operation of the device is always in a defined proportionality to the pressure at the first point, and the restrictors are selected so that the defined proportion is the desired selected ratio of the second pressure to the first pressure. The intermediate pressure is used as the auxiliary pressure.

In this case the conduit is preferably connected to atmosphere at its downstream end.

According to another feature of this invention, the means for producing the auxiliary pressure may comprise a conduit connected at one end to the first pressure point and having in it three restricting orifices in flow series, the upstream orifice being a variable-area orifice, the intermediate orifice being a fixed-area orifice and the downstream orifice being a venturi, and the restrictors are selected so that the ratio of the pressure at the first point to the pressure at the throat of the venturi is the desired selected ratio of the first pressure to the second pressure. The pressure at the throat of the venturi is used as the auxiliary pressure.

In this case the conduit may advantageously be connected at its downstream end to a point at the second pressure.

According to yet another feature of this invention, the means for producing the auxiliary pressure may comprise a pressure recovery device including an air jet means connected to receive an air supply from the first point, and a receiving chamber having an inlet so arranged at least partly in line with the air jet that part of the kinetic energy in the air jet is recovered as static pressure in the receiving chamber, it being arranged that the static pressure is the desired auxiliary pressure. The outlet of the air jet and the inlet of the receiver chamber will be spaced slightly apart, the space between them being vented. The recovery pressure in the receiving chamber may be varied by providing an adjustable obturator between the air jet and the air inlet, or by adjusting the position of the air jet means and the inlet to the receiving chamber relative to one another. In the latter case the air jet and the inlet will usually be offset to such an extent that say only half of the kinetic energy is recovered as static pressure.

Two embodiments of the pressure-sensitive device for use in controlling the main delivery of fuel in a reheat fuel system as described in U. S. application Serial No. 237,628, now Patent No. 2,814,928, issued Dec. 3, 1957, referred to will now be described with reference to the accompanying drawings in which—

Figure 4:
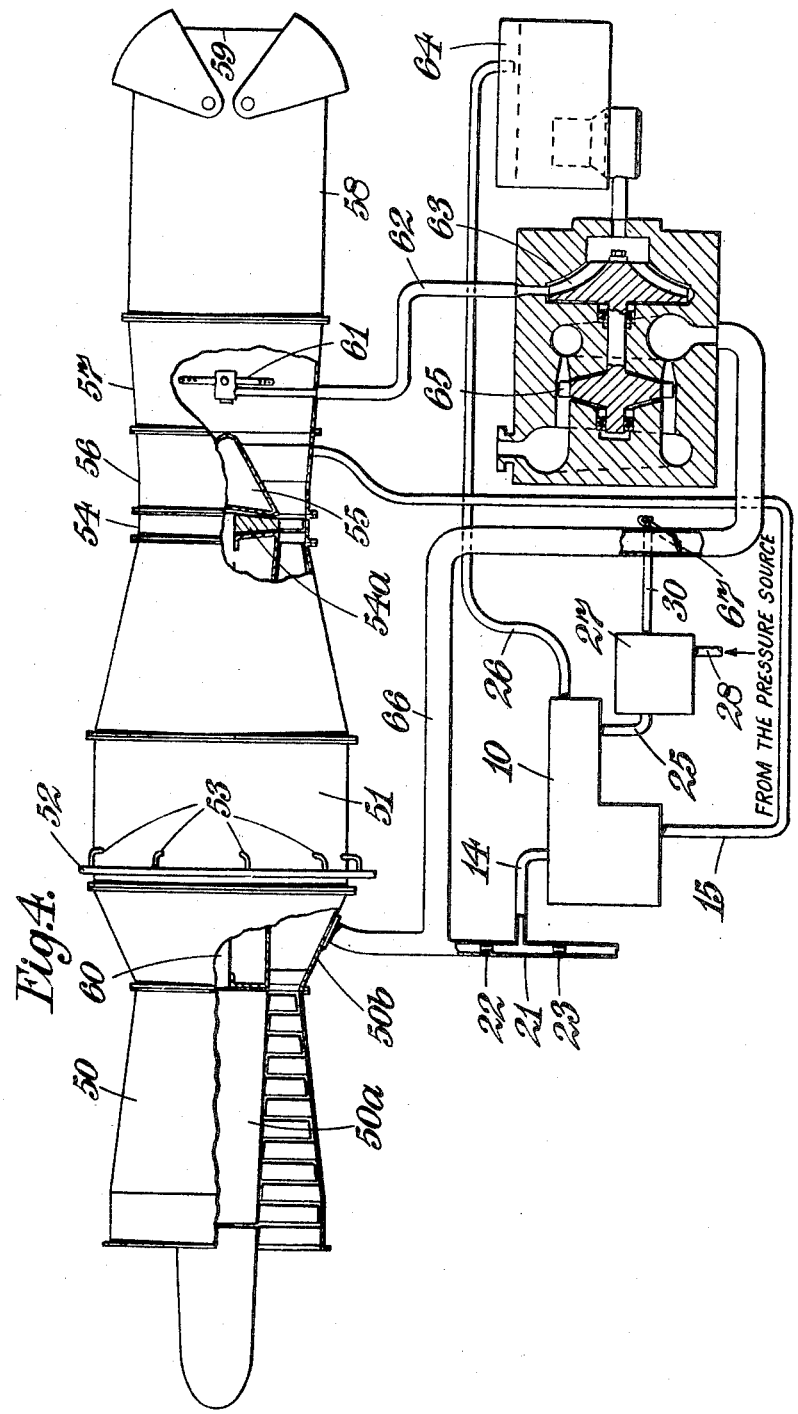
Figure 4 illustrates the application of the control to the reheat fuel system.

Referring first to Figure 4, there is shown a gas-turbine engine comprising a compressor 50, main combustion equipment 51 which receives air compressed in the compressor 50 and has fuel delivered into it to be burnt with the air, there being a fuel supply manifold 52 and supply branches 53, a turbine 54 connected to receive hot gases from the combustion equipment 51, an exhaust assembly including an exhaust cone structure having an inner bullet 55 and outer wall 56, and a jet pipe having a divergent section 57, a cylindrical section 58 and a variable-area outlet nozzle 59 for the exhaust gases. The turbine rotor 54a is connected to drive the compressor rotor 50a by means of a driving shaft 60.

The divergent jet-pipe section 57 has a series of fuel injectors 61 mounted in it to deliver fuel into the jet pipe for working fluid reheating purposes and the injectors 61 are fed with fuel through a supply pipe 62 by a centrifugal fuel pump 63 drawing fuel from a tank 64. The pump 63 is shown as being driven by an air turbine 65 drawing air for its operation from the compressor delivery section 50b through conduit 66, and an air throttle 67 is shown for controlling the speed of rotation of the air turbine 65 and fuel pump 63 and thus the rate of delivery of fuel to the injectors 61.

Figure 1:
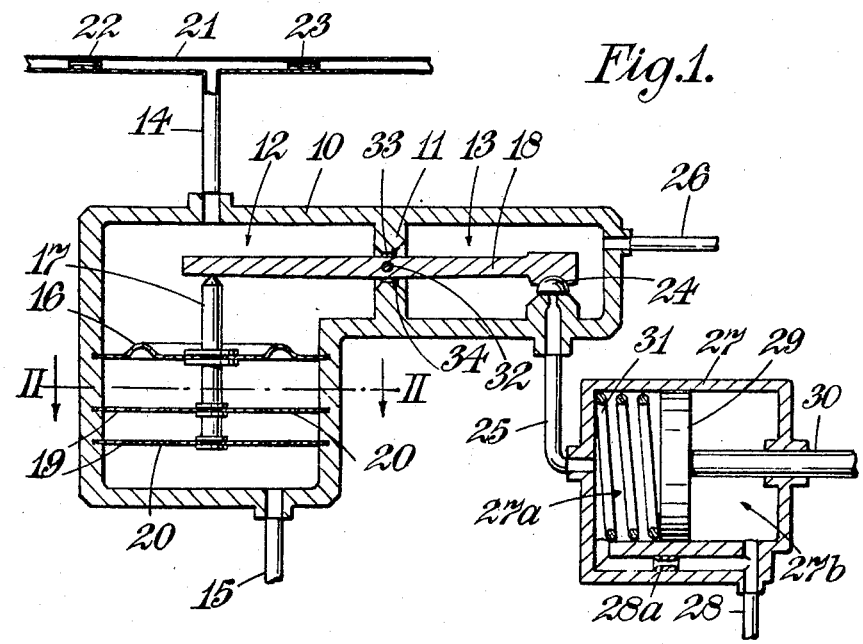
Figure 1 is a sectional view of one embodiment and an associated servo system.
Figure 2:
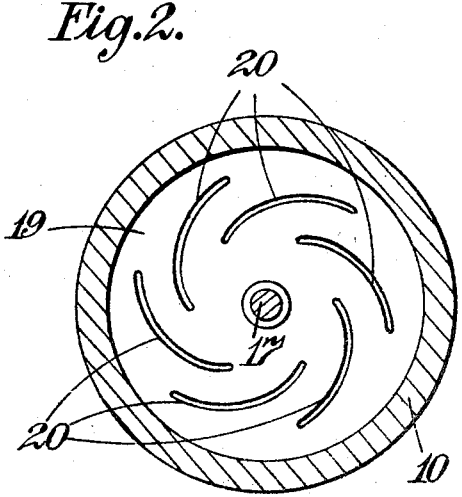
Figure 2 is a section on the line 2—2 of Figure 1.
Figure 3:
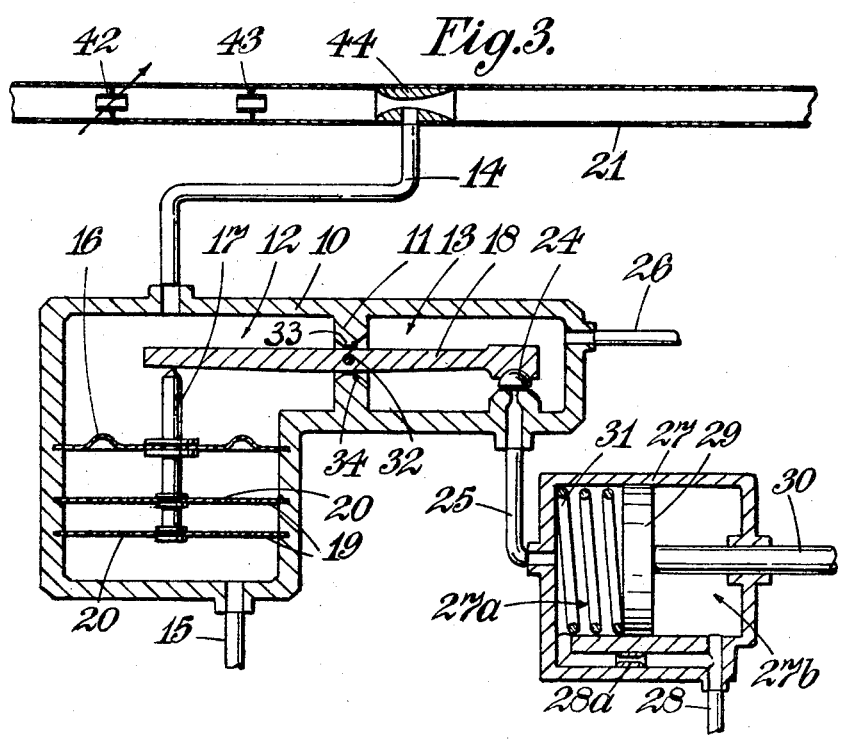
Figure 3 is a sectional view of a second embodiment.

The control for the throttle, in the arrangement of Figures 1 and 2, comprises a pressure-sensitive device including a casing 10 having an internal wall 11 which divides the casing into two chambers 12, 13. The chamber 12 has connected to it two conduits 14, 15 and a flexible diaphragm 16 is provided to divide the chamber 12 into two spaces, each of the conduits 14, 15 opening into one of the spaces.

The diaphragm 16 carries a central rod 17 one end of which co-operates with one end of a lever 18 which is pivoted in the wall 11 in a fluid-tight manner; the other end of the lever 18 projects into chamber 13 and operates a bleed valve 24 of a servo-mechanism through which the device actuates the air throttle 67.

The rod 17 is extended in a direction away from the lever 18 and is attached to the centres of two further flexible diaphragms 19 which are slotted as indicated at 20 in Figure 2 to form a number of arms connecting the centres with the peripheries; by curving the slots 20 the effective length of the arms is increased thereby giving greater freedom for axial movement of the rod 17. The diaphragms 19 have the effect of restraining the rod 17 against lateral movement.

The conduit 14 is connected to a conduit 21 at a point between two restrictors 22, 23. The conduit 21 is connected (at its left-hand end as seen in Figure 1 and at its upper end as seen in Figure 4) to the associated gas-turbine engine at a point between the outlet part of the compressor 50 and the inlet of the turbine 54, in this case to the compressor delivery section 50b; and the other end of the conduit 21 is, say, open to atmosphere. The conduit 21 may be connected to an outlet stage of the compressor 50 where the pressure is high enough. The restrictors 22, 23 are selected so that the downstream restrictor 23 is choked in operation and so that the ratio of the pressure between the restrictors 22, 23 (which acts on the upper surface of diaphragm 16) to the pressure at the inlet to conduit 21 is the ratio of the pressure at the second pressure point to the pressure at the first pressure point (in this case the compressor delivery 50b) which it is desired to maintain.

The conduit 15 is connected to the second pressure point (in this case at the exhaust unit outer wall 56), and thus if the pressure at this point has the desired value in relation to the pressure at the first point, then the pressures acting on the diaphragms 16 are equal. It will be appreciated therefore that the ratio of the desired second pressure to atmospheric pressure must be at least the choking value for orifice 23.

The bleed valve 24 controls the outflow from a bleed conduit 25 which leads from one end space 27a of a cylinder 27 of a servo motor, and a drain pipe 26 carries the bleed fluid away from chamber 13, say to fuel tank 64. The space 27a is connected through a restrictor 28a to the other end space 27b which has leading to it a pipe 28 receiving fluid from a pressure source, say from the delivery of the main fuel pump of the main fuel system for delivering fuel into the main combustion equipment 51 of the engine.

A piston 29 in cylinder 27 has a piston rod 30 connected to operate the air-throttle 67, and is therefore of larger area on the side of space 27a to that on the side of space 27b.

In operation, when the pressure at the second point is higher than that corresponding to the desired ratio, the diaphragm 16 is lifted closing the bleed valve 24 so that the pressure in space 27a tends to become equal to the pressure in space 27b, thus acting, owing to the difference of piston areas, to move the piston 29 to the right, and this movement is arranged to cause closing of the air-throttle 67 and thus a reduction of the reheat fuel supply to injectors 61 and, as a result, a reduction in the pressure at the second point.

A spring 31 may be provided in space 27a which loads the piston to close the air throttle 67 when the device is inoperative, and also assists the effect due to the difference of piston areas.

When the pressure at the second point is too low, the diaphragm 16 lowers and the valve 24 opens allowing an increased bleed from space 27a and a fall of pressure therein, so that the piston 29 is moved to the left against the spring by the pressure loading, so causing opening of the air-throttle 67 and an increased reheat fuel supply, thus restoring the pressure at the second point to the appropriate value.

If desired the diaphragms 16, 19 and pressure connections 14, 15 may be reversed in position relative to the lever 18, the diaphragms 16, 19 and connection 15 being thus above lever 18 as viewed in Figure 1 and the connection 14 being below the lever. Thus if the pressure at the second point is too high, the valve 24 will be opened and if the pressure is too low the valve 24 will be closed; it will thus be necessary to arrange that movement of piston 29 to the left closes the air throttle 67 and movement to the right opens the air throttle.

In a second arrangement, instead of the conduit 21 merely having two restrictors in series, it may be provided with three restricting orifices 42, 43, 44, of which the upstream orifice 42 is of variable area for the purpose of adjustment to preselect the desired value of the ratio, the intermediate orifice 43 is of fixed area, and the downstream orifice 44 is shaped as a venturi. The orifices are dimensioned so that the downstream orifice 44 is choked in operation, and the tapping 14 is taken from the throat of the venturi 44.

Suppose for example the desired ratio of the pressure at the first point to that at the second point is 3.6, then the dimensions of the orifices including the venturi might be such that, calling the pressure at the first point P, the pressure between the first and second orifices 42, 43 is $P/1.1$, the pressure between the second orifice 43 and the downstream orifice 44 is $P/1.8$, and the pressure at the venturi throat is $P/3.6$.

This arrangement has the advantage that the downstream orifice may be choked at a lower value of the ratio of the pressure in the chamber 12 (i. e. under equilibrium conditions that at the second point) to that at the downstream end of conduit 21 (say atmosphere), and also has the further advantage that the possibility of the effective areas of the restrictors varying with change in overall pressure ratio from upstream to downsteam of conduit 21 may be substantially avoided.

With this second arrangement it is possible for the venturi 44 to exhaust to jet pipe pressure, and hence it may be ensured that the pressure ratio (at the equilibrium point) across each of the restrictors is constant irrespective of altitude or forward speed, due to the overall ratio from upstream to downstream of the conduit 21 being maintained constant by the control.

Instead of the conduit 14 being connected as shown it may for instance be connected to the receiving chamber of a device having a receiver inlet arranged to recover as static pressure some of the kinetic energy from an air jet of which the air pressure is derived from the first point, there being an obturator to interrupt part of the jet so that the pressure in the receiving chamber is a desired proportion of the pressure at the first point. Instead of the obturator, the relative positions of the jet and an inlet to the receiving chamber may be adjustable so that the area of the receiver inlet which lies in the jet stream is varied and thus the pressure recovery is varied. This may conveniently be done by having two discs spaced apart in a tubular housing, the discs being formed each with a drilled hole at the same radius from the centre of the tube, and by rotating one disc relative to the other in the tubular housing. When the holes are aligned the pressure recovery is a maximum. The space between the jet and the inlet to the receiver chamber in the first case, and the space between the discs in the second, is vented to atmosphere.

The lever 18 is supported in the wall 11 by means of a pivot pin 32 and in order to provide a fluid seal between the two chambers 12 and 13 a groove is formed around the hole 33 in the wall through which the lever 18 passes and a rubber sealing ring 34 is accommodated in the groove to contact the lever 18 as close as possible to the pivot pin 32.

The outlet end of the conduit 21 may be connected to any convenient point at low pressure, such that the downstream restrictor in the conduit is choked in operation.

It will thus be seen that the devices provide improved means for maintaining the ratio of the pressure at a point between the compressor delivery and the turbine inlet to the pressure just downstream of the turbine at a preselected value.

I claim:

In a fuel system for a gas-turbine engine having a compressor, main combustion equipment, a turbine, reheat combustion equipment, and a propelling nozzle connected in flow series, the fuel system comprising a fuel pump connected to deliver fuel to the reheat combustion equipment, an air turbine connected to drive the fuel pump, a source of compressed air, and an air-supply-controlling throttle connected to control the supply of compressed air from the source to the air turbine thereby to control the rotational speed of the turbine, a pressure-sensitive device comprising fluid flow means having an inlet, a first pressure point in the engine between the compressor and the turbine and to which said inlet is connected, a second pressure point in the engine between the turbine and the propelling nozzle, means to produce in the fluid flow means an auxiliary pressure source such that the ratio of the auxiliary pressure to the pressure at the first pressure point is equal to the desired ratio of the pressure at the second pressure point to that at the first pressure point, the said means to produce the auxiliary pressure comprising a conduit connected at one end to the first pressure point, three restricting orifices in flow series in said conduit, the upstream orifice being a variable-area orifice, the intermediate orifice being a fixed-area orifice and the downstream orifice being a venturi, and the restrictions of the orifices being selected so that the ratio of the pressure at the throat of the venturi to the pressure at the first point is the desired ratio of the pressure at the second point to the pressure at the first point, and a flexible diaphragm connected to be loaded on one side by the pressure at the throat of the venturi and on the other side by the pressure at the second pressure point and adapted to control adjustment of the throttle in a manner to maintain the pressure at said second pressure point equal to the auxiliary pressure whereby the throttle is adjusted upon sensing a departure of the actual ratio of the pressure at the first pressure point to the pressure at the second pressure point from the desired ratio.

References Cited in the file of this patent

UNITED STATES PATENTS

| | | |
|---|---|---|
| 2,570,591 | Price | Oct. 9, 1951 |
| 2,612,020 | Griffith | Sept. 30, 1952 |
| 2,640,316 | Neal | June 2, 1953 |
| 2,677,233 | Jordon | May 4, 1954 |
| 2,683,349 | Lawrence | July 13, 1954 |